(12) United States Patent
Kawabe et al.

(10) Patent No.: US 7,917,917 B2
(45) Date of Patent: Mar. 29, 2011

(54) TRAY EJECTING MECHANISM AND MEDIUM DRIVE DEVICE THAT PREVENTS AN EJECTION SWITCH FROM BEING PRESSED WHEN AN EJECTABLE TRAY IS OPEN

(75) Inventors: Hidetoshi Kawabe, Tokyo (JP); Yutaka Ogasawara, Saitama (JP); Kazuhito Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 776 days.

(21) Appl. No.: 11/933,733

(22) Filed: Nov. 1, 2007

(65) Prior Publication Data

US 2008/0134222 A1    Jun. 5, 2008

(30) Foreign Application Priority Data

Dec. 1, 2006   (JP) ................................ P2006-325529

(51) Int. Cl.
  *G11B 33/02*   (2006.01)
  *G11B 17/056*  (2006.01)
(52) U.S. Cl. ........................................ 720/647; 720/637
(58) Field of Classification Search .................... 720/637
  See application file for complete search history.

(56) References Cited

U.S. PATENT DOCUMENTS

| 6,654,251 | B2 * | 11/2003 | Yun ............................... 361/724 |
| 2004/0169997 | A1 * | 9/2004 | Voon et al. ..................... 361/685 |
| 2005/0240951 | A1 * | 10/2005 | Chen et al. .................... 720/655 |
| 2005/0264989 | A1 * | 12/2005 | Chen et al. .................... 361/683 |
| 2007/0075612 | A1 * | 4/2007 | Zhao ........................... 312/223.2 |

FOREIGN PATENT DOCUMENTS

JP    9-223348    8/1997

* cited by examiner

*Primary Examiner* — Craig A. Renner
*Assistant Examiner* — Tamara Ashford
(74) *Attorney, Agent, or Firm* — Oblon, Spivak, McClelland, Maier & Neustadt, L.L.P.

(57) ABSTRACT

A tray ejecting mechanism includes a stationary bezel mounted to a front surface of an ejectable tray, and a movable bezel movably attached to the stationary bezel while being biased in a front-surface direction. The stationary bezel includes a detection component positionally shiftable in accordance with an open/close position of the tray, and a switch component having a pressing portion for pressing an ejection switch on the tray and being positionally shiftable in conjunction with the detection component. When the tray is closed, the switch component is positioned such that, as the movable bezel is pushed inward, a pressing rib applies a pressing force to the pressing portion to press the ejection switch. When the tray is open, the ejection switch is prevented from being pressed by the pressing portion even if the movable bezel is pushed inward toward the stationary bezel.

6 Claims, 15 Drawing Sheets

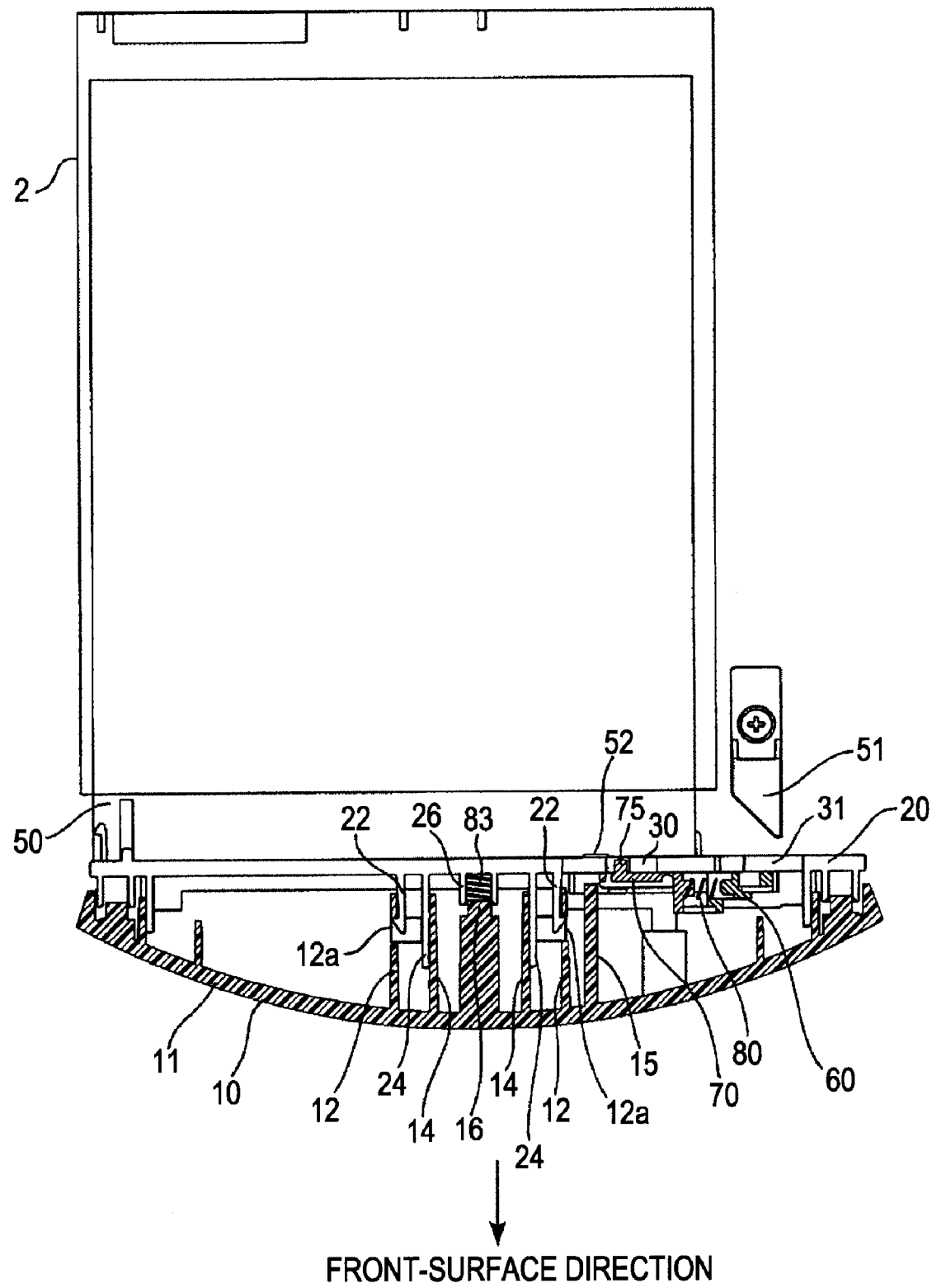

TRAY EJECTING MECHANISM AND MEDIUM DRIVE DEVICE THAT PREVENTS AN EJECTION SWITCH FROM BEING PRESSED WHEN AN EJECTABLE TRAY IS OPEN

CROSS REFERENCES TO RELATED APPLICATIONS

The present invention contains subject matter related to Japanese Patent Application JP 2006-325529 filed in the Japanese Patent Office on Dec. 1, 2006, the entire contents of which are incorporated herein by reference.

BACKGROUND OF THE INVENTION

1. Field of the Invention

The present invention relates to a medium drive device that drives a recording medium, such as an optical disc, and has an ejectable tray that holds the medium, and particularly, to a structure of a tray ejecting mechanism contained in the device.

2. Description of the Related Art

Japanese Unexamined Patent Application Publication No. 9-223348 discloses a disc drive device of an ejectable tray type.

As a disc drive device installed in an apparatus such as a personal computer, a disc drive of an ejectable tray type is widely used.

FIG. 16A illustrates an example of a notebook-size personal computer 100 equipped with a disc drive device having a tray that is ejectable from a side surface of a housing. A front surface of the tray has a bezel 101 attached thereto, which serves as an outer housing. The bezel 101 defines part of the outer housing of the personal computer 100.

In many cases, the bezel 101 has an ejection control button 102 thereon as shown in FIG. 16A. When a user presses the ejection control button 102, the tray is ejected. There are also cases where the ejection control button 102 is provided separately from the bezel 101 as shown in FIG. 16B.

SUMMARY OF THE INVENTION

The reason the ejection control button 102 is provided on the bezel 101 as in the example shown in FIG. 16A is that, in a typical structure of a disc drive device, an ejection switch for outputting an eject signal is disposed at the tip end of the disc tray as, for example, a tactile switch. In other words, when the user presses the ejection control button 102 on the bezel 101, the tactile switch (ejection switch) disposed at the front surface of the disc tray is pressed, whereby an eject signal is output. A tray driving mechanism having, for example, an internal plunger or motor is actuated in response to the eject signal, whereby the disc tray is ejected.

However, the above-described configuration causes limitations in the location and the size of the ejection control button 102 on the bezel 101 and thus has an adverse effect on the design and the layout.

In addition, depending on the position of the disc drive device installed in the apparatus, it may be difficult to find or press the ejection control button 102 designed under these limitations, which can be problematic in view of usability.

In order to solve the aforementioned problems, the ejection control button 102 may be disposed separately from the bezel 101 as shown in FIG. 16B. In that case, however, it becomes necessary to add a tactile switch (ejection switch) to the apparatus and to change the software so that the ejecting operation can be performed in response to a signal from that tactile switch.

It is desirable to achieve greater design and layout flexibility of the bezel and better operationability while still using the ejection switch (tactile switch) provided on the tray of the disc drive device without modifications.

According to an embodiment of the present invention, there is provided a tray ejecting mechanism that includes a stationary bezel mounted to a front surface of an ejectable tray included in a medium drive device; and a movable bezel attached to the stationary bezel in a movable manner in a front-back direction while being biased towards a front surface of the movable bezel, the movable bezel serving as an outer housing of the medium drive device contained in an electronic apparatus. The stationary bezel includes a detection component that is positionally shiftable in accordance with an open/close position of the tray, and a switch component having a pressing portion for pressing an ejection switch provided on the tray, the switch component being positionally shiftable in conjunction with the detection component. The movable bezel includes a pressing rib that applies a pressing force to the pressing portion in order to press the ejection switch. When the tray is closed, the switch component is positioned such that, as the movable bezel is pushed inward toward the stationary bezel, the pressing rib applies the pressing force to the pressing portion so that the pressing portion presses the ejection switch. When the tray is open, the switch component is positioned such that the ejection switch is prevented from being pressed by the pressing portion even if the movable bezel is pushed inward toward the stationary bezel.

The tray ejecting mechanism may further include an arm contactable with the detection component. A contact relationship the arm has with the detection component is changeable in accordance with the open/close position of the tray so that the detection component is positionally shiftable in accordance with the open/close position of the tray.

Furthermore, when the tray is closed, the pressing portion of the switch component is preferably at a position facing the ejection switch in accordance with the position of the detection component so that when the movable bezel is pushed inward toward the stationary bezel, the pressing portion presses the ejection switch in response to the pressing force of the pressing rib. On the other hand, when the tray is open, the pressing portion of the switch component is preferably positioned so as not to face the ejection switch in accordance with the position of the detection component, and moreover, when the movable bezel is pushed inward toward the stationary bezel, the pressing rib restricts the movement of the switch component to prevent the pressing portion from reaching the position facing the ejection switch so as to prevent the ejection switch from being pressed.

The detection component and the switch component may include sliders that are slidable within the stationary bezel.

According to another embodiment of the present invention, there is provided a tray ejecting mechanism that includes a stationary bezel mounted to a front surface of an ejectable tray included in a medium drive device; a movable bezel attached to the stationary bezel in a movable manner in a front-back direction while being biased towards a front surface of the movable bezel, the movable bezel serving as an outer housing of the medium drive device contained in an electronic apparatus; and an arm fixed at a predetermined position. The stationary bezel includes a detection component that is positionally shiftable in accordance with an open/close position of the tray, the detection component being positionally shifted on the basis of a contact relationship the detection component has with the arm, and a switch component having a pressing portion for pressing an ejection switch provided on the tray, the switch component being positionally shiftable in conjunction with the detection component. The movable bezel includes a pressing rib that applies a pressing force to the pressing portion in order to press the ejection switch. When the tray is closed, the pressing portion of the switch component is at a position facing the ejection switch in accordance with the position of the detection component so that when the movable bezel is pushed inward toward the stationary bezel, the pressing rib applies the pressing force to the pressing portion so as to operate the ejection switch. When the tray is open, the pressing portion of the switch component is positioned so as not to face the ejection switch in accordance with the position of the detection component, and moreover, when the movable bezel is pushed inward toward the stationary bezel, the pressing rib restricts the movement of the switch component to prevent the pressing portion from reaching the position facing the ejection switch so as to prevent the ejection switch from being operated.

A medium drive device according to an embodiment of the present invention has an ejectable tray. The medium drive device includes a tray ejecting mechanism that includes a stationary bezel mounted to a front surface of the tray, and a movable bezel attached to the stationary bezel in a movable manner in a front-back direction while being biased towards a front surface of the movable bezel, the movable bezel serving as an outer housing of the medium drive device contained in an electronic apparatus. The stationary bezel includes a detection component that is positionally shiftable in accordance with an open/close position of the tray, and a switch component having a pressing portion for pressing an ejection switch provided on the tray, the switch component being positionally shiftable in conjunction with the detection component. The movable bezel includes a pressing rib that applies a pressing force to the pressing portion in order to press the ejection switch. When the tray is closed, the switch component is positioned such that, as the movable bezel is pushed inward toward the stationary bezel, the pressing rib applies the pressing force to the pressing portion so that the pressing portion presses the ejection switch. When the tray is open, the switch component is positioned such that the ejection switch is prevented from being pressed by the pressing portion even if the movable bezel is pushed inward toward the stationary bezel.

The medium drive device according to the above embodiment of the present invention, such as a tray-type optical disc drive, is widely used in an apparatus such as a notebook-size personal computer. In the medium drive device, a tray ejecting mechanism can be realized simply by providing a pushable bezel mounted to the tip end of the tray without having to change the mechanism of the medium drive device itself or the software.

For example, the tray ejecting mechanism according to each of the above embodiments of the present invention can be realized by attaching the stationary bezel and the movable bezel to a front surface of a disc tray of a disc drive device.

In each of the above embodiments of the present invention, a tactile switch normally provided at the tip end of a tray is directly used as an ejection switch that outputs an eject signal for the tray.

In the related art as described above with reference to FIG. 16A, the tactile switch is pushed using the ejection control button 102 set on the bezel. In contrast, in each of the above embodiments, the user pushes the entire bezel (i.e. the movable bezel) in place of the ejection control button 102. In other words, the entire bezel is pushable by the user. This means that it is not necessary to provide a user-operable ejection control button on the bezel.

However, the mechanism in which the internal ejection switch is pressed by simply pushing the entire bezel is still insufficient. Specifically, because the user will push the bezel inward when he/she should try to close the tray, the ejection switch in this case will undesirably be pressed by the bezel. As a result, an eject signal will undesirably be output when the user tries to close the tray, which means that the tray will be ejected immediately after it is closed. Needless to say, the disc tray becomes non-closable.

In order to solve this problem, each of the above embodiments of the present invention provides a mechanism having the following features. Specifically, the bezel is divided into a stationary bezel and a movable bezel. Moreover, a switch component for pressing the ejection switch is interposed between the bezels and the ejection switch so that the ejection switch is not directly pressed by a bezel. Furthermore, the position of the switch component is switchable between an open position and a closed position. This prevents the ejection switch from being pressed when the user tries to close the tray but allows the ejection switch to be pressed only when the user tries to eject the tray.

The above embodiments of the present invention each provide a bezel-pushable-type ejecting mechanism in which the bezel itself functions as an ejection control button, meaning that an ejection control button is not provided on the bezel. Accordingly, this reduces limitations in design and layout of the bezel. Furthermore, the medium drive device can be set at a location of an apparatus such as a personal computer where, with a small ejection control button of the related art, it is difficult to find the button or to press the button. This reduces limitations in design and layout of the entire apparatus, thereby contributing to better usability for the user. Accordingly, each of the above embodiments of the present invention contributes to enhanced external appearance of the medium drive device, enhanced external appearance of the apparatus equipped with the medium drive device, and better usability.

In addition, the above embodiments of the present invention also overcome the disadvantage in a bezel-pushable-type ejecting mechanism since the ejection switch positioned within the bezel is prevented from being pressed when the user tries to close the tray, but is pressed only when the user tries to eject the tray.

Accordingly, the above embodiments can be readily realized by simply attaching the bezels (i.e. the stationary bezel and the movable bezel) of the above embodiments onto the front surface of a normal medium drive device. Therefore, the above embodiments of the present invention are advantageous in that it is not necessary to change the structure of the drive device or the software.

BRIEF DESCRIPTION OF THE DRAWINGS

FIG. 7 is a plan view showing a state where a disc tray according to the embodiment is open;

DESCRIPTION OF THE PREFERRED EMBODIMENTS

An embodiment of the present invention will be described below with reference to FIGS. 1A to 15. This embodiment is directed to an example where a medium drive device is defined by a disc drive device that performs a recording or reproducing operation on an optical disc.

Figure 1A:
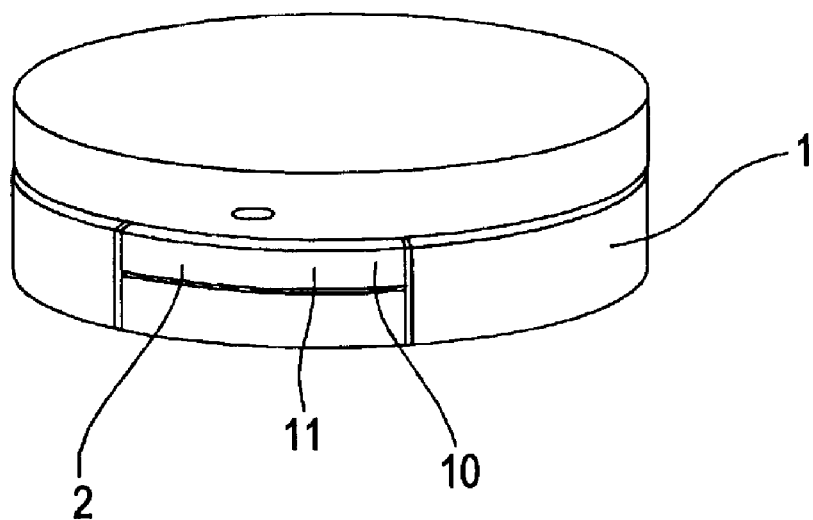
FIGS. 1A and 1B are perspective views of an apparatus equipped with a disc drive device according to an embodiment of the present invention.
Figure 1B:
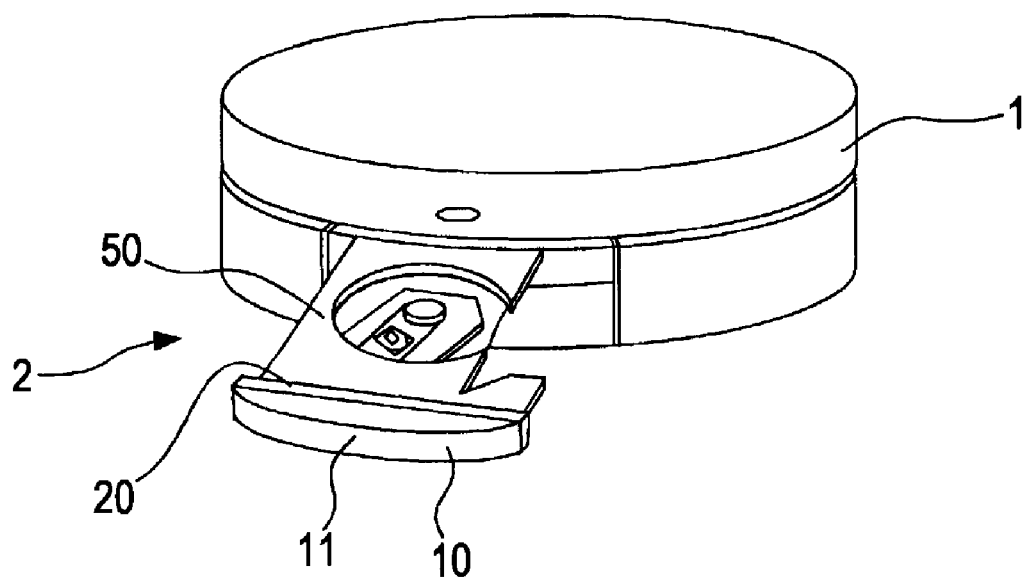

FIGS. 1A and 1B illustrate a housing 1 of an apparatus in which a disc drive device 2 is installed. The apparatus may be an information apparatus such as a personal computer or an audio visual (AV) apparatus such as an AV disc player and an AV disc recorder. Although the housing 1 of the apparatus shown in FIGS. 1A and 1B is cylindrical, the apparatus may alternatively have a rectangular parallelepiped housing.

In this embodiment, the disc drive device 2 is disposed at a side surface of the cylindrical housing 1. FIG. 1A schematically shows a state where a disc tray 50 is closed, whereas FIG. 1B schematically shows a state where the disc tray 50 is opened (ejected).

The disc tray 50 has a chucking portion engageable to the center hole of an optical disc, and also has an optical pickup. By ejecting the disc tray 50 as shown in FIG. 1B, a user can insert or take out an optical disc into or from the apparatus.

In this embodiment, a movable bezel 10 and a stationary bezel 20 are attached to the front surface of the disc tray 50.

The stationary bezel 20 is fixed to the front surface of the disc tray 50.

The movable bezel 10 is attached to the stationary bezel 20 in a movable manner in the front-back direction while being biased towards the front surface of the movable bezel 10. In other words, the movable bezel 10 is attached in a manner such that the user can push the movable bezel 10 inward toward the stationary bezel 20 (i.e. towards the interior of the housing).

In this embodiment, the movable bezel 10 has a bezel front-surface 11, which is a curved surface having the same curvature as the side surface of the cylindrical housing 1. Thus, the bezel front-surface 11 is part of the side surface of the cylindrical housing 1.

The movable bezel 10 that defines part of the side surface of the housing 1 entirely functions as an ejection control button for the user.

Specifically, when the user pushes the bezel front-surface 11 in the state shown in FIG. 1A, an ejection switch (i.e. a tactile switch 52 to be described hereinafter) provided in the disc tray 50 is pressed, whereby an ejecting operation of the disc drive device 2 is implemented. As a result, the disc tray 50 becomes ejected as shown in FIG. 1B.

On the other hand, in order to close the disc tray 50 from the open state of the disc tray 50 shown in FIG. 1B, the user may push the bezel front-surface 11 towards the interior of the housing 1. In this case, the ejection switch is not pressed even if the movable bezel 10 is pushed.

A tray ejecting mechanism will be described in detail below.

Figure 2A:
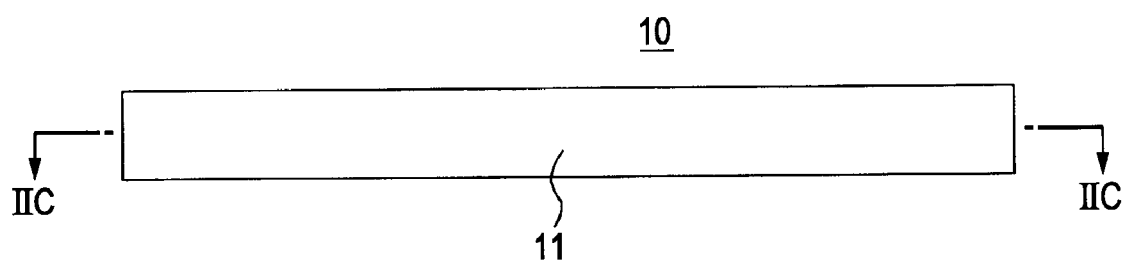
FIGS. 2A to 2C are a front view, a plan view, and a cross-sectional view of a movable bezel according to the embodiment, the cross-sectional view in FIG. 2C being taken along line IIC-IIC in FIG. 2A.
Figure 2B:
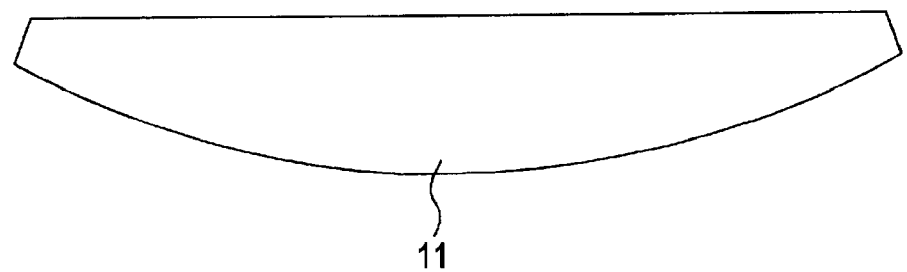
Figure 2C:
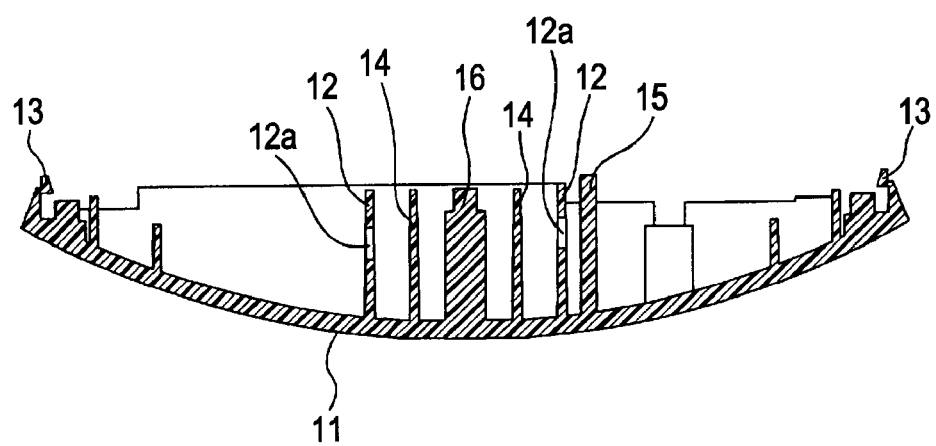

FIGS. 2A, 2B, and 2C are a front view, a top view, and a cross-sectional view of the movable bezel 10. The cross-sectional view of FIG. 2C is taken along line IIC-IIC in FIG. 2A.

As mentioned above, the bezel front-surface 11 is a curved surface having the same curvature as the side surface of the cylindrical housing 1.

The movable bezel 10 is composed of, for example, resin. The movable bezel 10 contains a pair of locking ribs 12 for maintaining the strength of the movable bezel 10 and used for attaching the movable bezel 10 to the stationary bezel 20. Moreover, the movable bezel 10 also has locking segments 13 at opposite ends thereof. Each of the locking ribs 12 has a locking hole 12a. The movable bezel 10 also has a spring-pressing portion 16 at the center thereof, and a pair of positioning ribs 14 at opposite sides of the spring-pressing portion 16.

Furthermore, the movable bezel 10 has a pressing rib 15 at a position corresponding to the tactile switch 52 of the disc tray 50 to be described hereinafter.

Figure 3A:
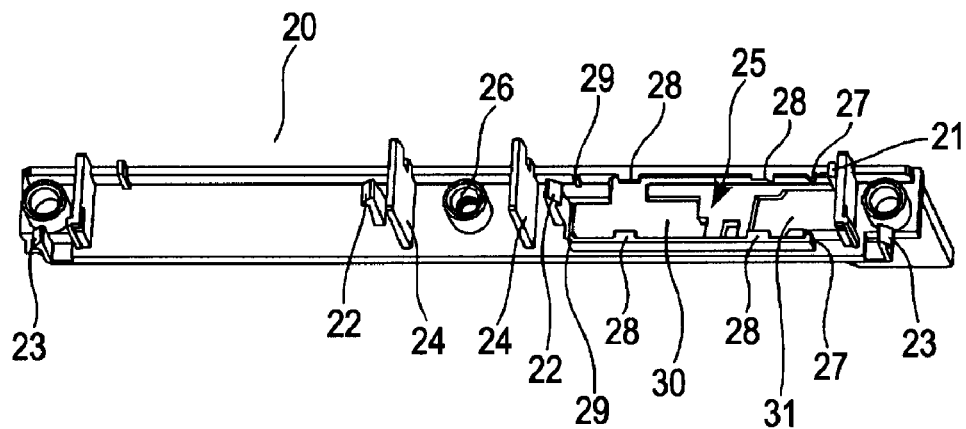
FIG. 3A is a perspective view of a stationary bezel according to the embodiment.

FIG. 3A is a lower perspective view of the stationary bezel 20.

Figure 3B:
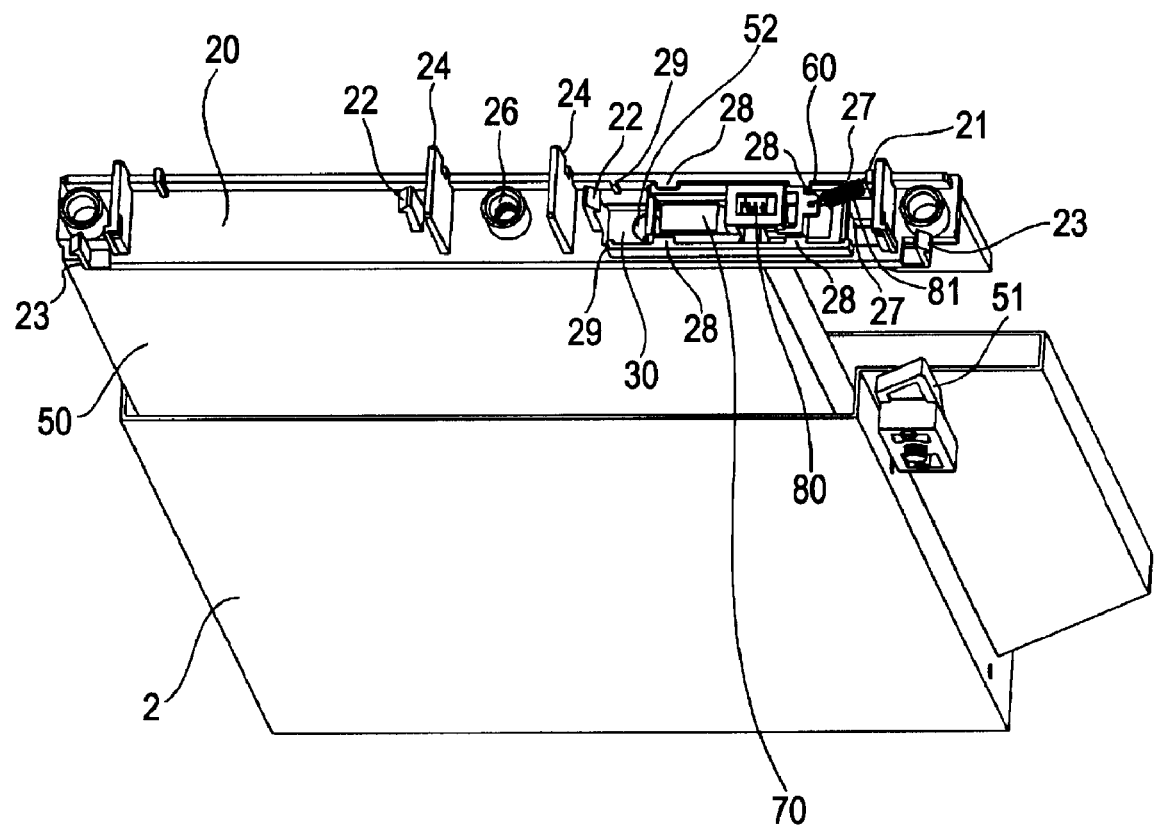
FIG. 3B is a perspective view of the disc drive device having the stationary bezel mounted thereto.
Figure 4A:
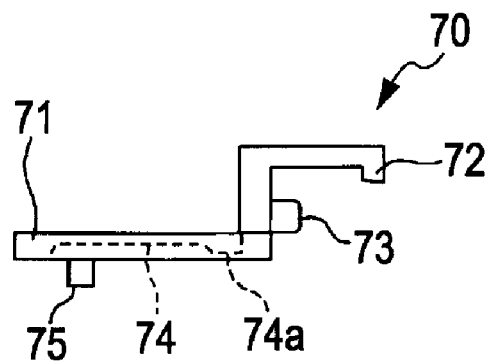
FIGS. 4A to 4D are a front view, a plan view, a bottom view, and a left side view of a switch slider according to the embodiment.
Figure 4B:
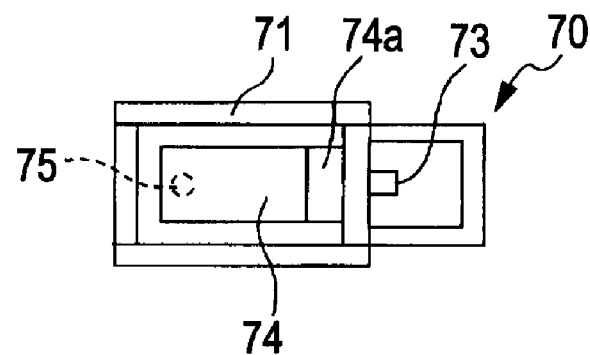
Figure 4C:
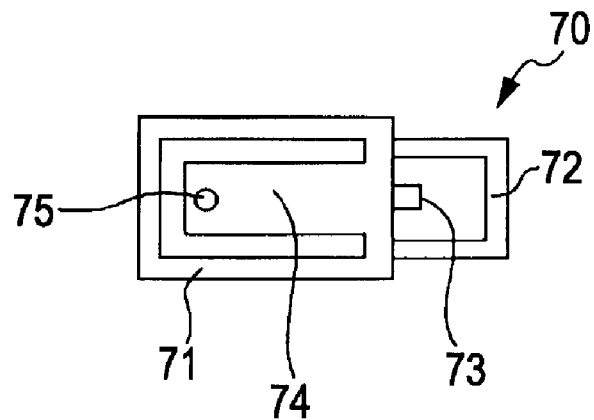
Figure 4D:
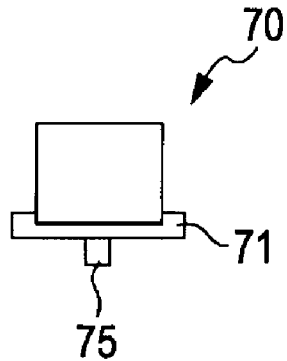
Figure 5A:
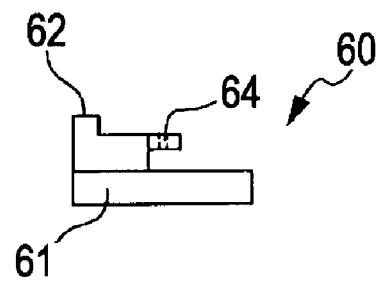
FIGS. 5A to 5D are a front view, a plan view, a bottom view, and a left side view of a tray-position detection slider according to the embodiment.
Figure 5B:
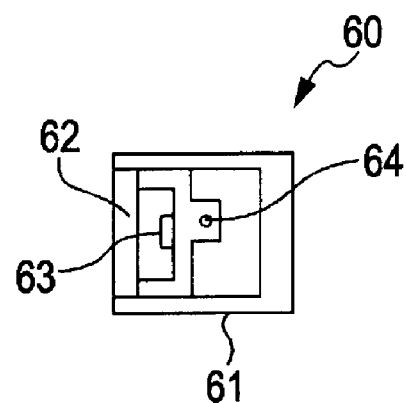
Figure 5C:
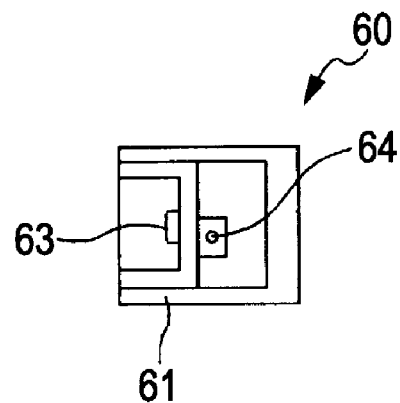
Figure 5D:
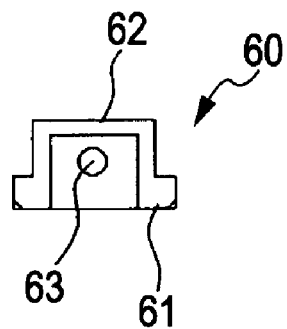

FIG. 3B is a lower perspective view of the disc drive device 2, which has the stationary bezel 20 attached to the front surface of the disc tray 50.

In FIG. 3B, the stationary bezel 20 has attached thereto a tray-position detection slider 60 and a switch slider 70, which will be described hereinafter with reference to FIGS. 4A to 4D, 5A to 5D, and 6A and 6B.

The structure of the stationary bezel 20 will be described first with reference to FIG. 3A.

The stationary bezel 20 shown in FIG. 3A is also composed of, for example, resin. The stationary bezel 20 is a predetermined rectangular plate mountable to the front surface of the disc tray 50 and has various portions as shown in FIG. 3A. Specifically, the stationary bezel 20 has a pair of locking claws 22 at the central region thereof, which are used for attaching the stationary bezel 20 to the movable bezel 10. The stationary bezel 20 also has a pair of locking segments 23 at opposite ends thereof.

Furthermore, the stationary bezel 20 has a spring-holding portion 26 at the center thereof, and a pair of positioning ribs 24 at opposite sides of the spring-holding portion 26.

The movable bezel 10 is attached to the stationary bezel 20 as shown in FIG. 7.

The attachment position of the movable bezel 10 relative to the stationary bezel 20 is set by having the positioning ribs 14 and 14 of the movable bezel 10 fitted between the positioning ribs 24 and 24 of the stationary bezel 20.

Furthermore, the spring-holding portion 26 holds therein a bezel-pressing spring 83, and the spring-pressing portion 16 of the movable bezel 10 presses against this bezel-pressing spring 83.

Although the movable bezel 10 is biased away from the stationary bezel 20 (i.e. in the front-surface direction) due to the bezel-pressing spring 83, the movable bezel 10 is prevented from falling off in the front-surface direction by having the locking holes 12a and 12a of the locking ribs 12 and 12 provided in the movable bezel 10 respectively engaged with the locking claws 22 and 22 of the stationary bezel 20. Although not shown in FIG. 7, the locking segments 23 and 23 at the opposite ends of the stationary bezel 20 are respectively engaged with the locking segments 13 and 13 of the movable bezel 10.

According to this structure, the movable bezel 10 is attached to the stationary bezel 20 in a movable manner in the front-back direction while being biased in the front-surface direction. Specifically, the movable bezel 10 is pushable towards the stationary bezel 20 to an extent that the movable bezel 10 has a desired movable range that can be recognized as a control switch by the user.

Referring back to FIG. 3A, the stationary bezel 20 will be described below.

The stationary bezel 20 has a slider storage portion 25 for accommodating the tray-position detection slider 60 and the switch slider 70. The slider storage portion 25 is a section surrounded by the back surface, the top-surface rib, and the bottom-surface rib of the stationary bezel 20, and has claws 28 that prevent the sliders 60 and 70 from falling off in the front-surface direction. The back surface of the slider storage portion 25 (i.e. the surface proximate to the disc tray 50) has openings 30 and 31.

The top-surface rib and the bottom-surface rib of the slider storage portion 25 have stopper ribs 27 and 27 and stopper ribs 29 and 29 at predetermined positions. Specifically, the stopper ribs 27 and 27 define the slidable range of the tray-position detection slider 60, and the stopper ribs 29 and 29 define the slidable range of the switch slider 70.

The stationary bezel 20 also has a spring-locking portion 21.

Referring to FIG. 3B, the slider storage portion 25 has the tray-position detection slider 60 and the switch slider 70 disposed therein.

The tray-position detection slider 60 and the spring-locking portion 21 have a slider-pulling spring 81 attached therebetween.

The tray-position detection slider 60 and the switch slider 70 are engaged to each other with a slider-pushing spring 80 interposed therebetween.

The tray-position detection slider 60 is positioned in front of the opening 31, and an arm 51 is attached to a position corresponding to the opening 31. As is apparent from FIG. 7, the arm 51 has an end surface that is inclined at about, for example, a 45° angle. This inclined end surface is contactable with the tray-position detection slider 60.

The arm 51 may be mounted to a bracket or chassis (not shown) of the disc drive device 2 or to a part of an internal substrate or housing of an electronic apparatus equipped with the disc drive device 2. In other words, the attachment position of the arm 51 may be determined in accordance with the structure of the apparatus or the disc drive device 2 such that the end portion of the arm 51 is located at a position corresponding to the opening 31.

The switch slider 70 is positioned in front of the opening 30, and as shown in FIG. 3B, the tactile switch 52 provided at the front surface of the disc tray 50 is exposed through this opening 30. The tactile switch 52 is a switch in the disc drive device 2 that outputs an eject signal when pressed. In other words, when the tactile switch 52 is pressed, an ejecting mechanism (not shown) is driven so that the disc tray 50 is ejected.

The switch slider 70 and the tray-position detection slider 60 will be described below with reference to FIGS. 4A to 6B.

FIGS. 4A, 4B, 4C, and 4D are a front view, a plan view, a bottom view, and a left side view of the switch slider 70, respectively.

The switch slider 70 has a slider body 71 that includes a movable-plate portion 74 having a thin-walled section 74a, and a pressing portion 75 on the lower surface of the movable-plate portion 74. The pressing portion 75 is a portion that presses the tactile switch 52.

Specifically, when the pressing rib 15 of the movable bezel 10 presses the upper surface of the movable-plate portion 74, the movable-plate portion 74 bends downward about the thin-walled section 74a, whereby the pressing portion 75 can press the tactile switch 52.

The slider body 71 also has an engagement segment 72 extending continuously therefrom.

Furthermore, below the engagement segment 72 is provided a spring supporter 73 that supports the slider-pushing spring 80.

FIGS. 5A, 5B, 5C, and 5D are a front view, a plan view, a bottom view, and a left side view of the tray-position detection slider 60.

The tray-position detection slider 60 has a slider body 61 from which an engagement segment 62 continuously extends.

Below the engagement segment 62 is provided a spring supporter 63 that supports the slider-pushing spring 80.

The tray-position detection slider 60 also has a spring-locking portion 64 to which one end of the slider-pulling spring 81 is engaged.

Figure 6A:
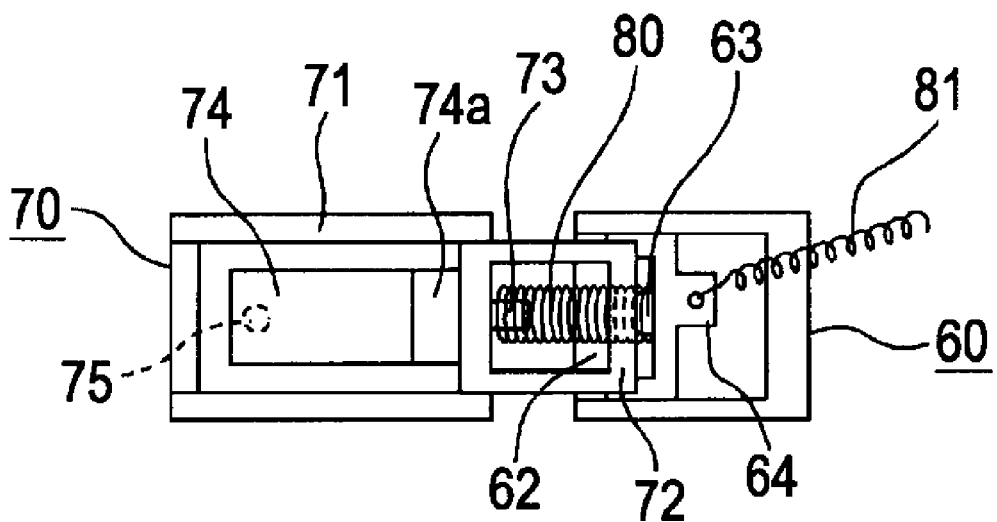
FIGS. 6A and 6B illustrate the switch slider and the tray-position detection slider according to the embodiment in an engaged state.
Figure 6B:
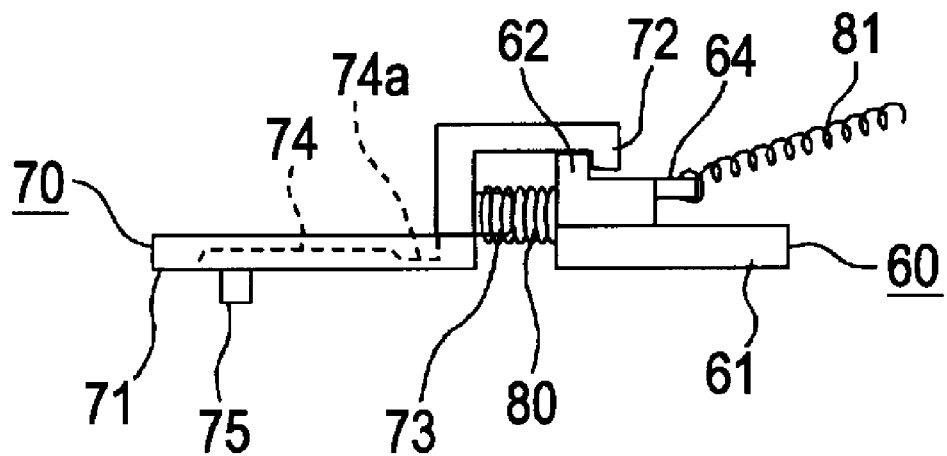

The tray-position detection slider 60 and the switch slider 70 are accommodated within the stationary bezel 20 in a state such that the sliders 60 and 70 are engaged to each other as shown in a plan view and a front view in FIGS. 6A and 6B, respectively.

Specifically, the tray-position detection slider 60 and the switch slider 70 are engaged to each other such that the engagement segment 72 of the switch slider 70 overlies the engagement segment 62 of the tray-position detection slider 60. The spring supporters 63 and 73 have the slider-pushing spring 80 attached therebetween. Thus, the sliders 60 and 70 are biased away from each other while the separation distance therebetween is limited by the engagement segments 62 and 72.

The slider-pulling spring 81 extends between the spring-locking portion 64 of the tray-position detection slider 60 and the spring-locking portion 21 of the stationary bezel 20 shown in FIGS. 3A and 3B.

In the above-described manner, the sliders 60 and 70 are accommodated within the stationary bezel 20 as shown FIGS. 3B and 7.

Before proceeding on to the description of the overall operation, the function of each component will be described below.

The stationary bezel 20 fixes the movable bezel 10 to the disc tray 50 and functions as a guide for both the sliders 60 and 70.

The movable bezel 10 is movable relative to the stationary bezel 20 in the same directions as the opening and closing directions of the disc tray 50, and presses the tactile switch 52 of the disc tray 50 via the switch slider 70. The movable bezel 10 has the same function as the ejection button of the related art.

The tray-position detection slider 60 comes into contact with the arm 51 inserted through the opening 31 so as to move in a reciprocal linear motion in conjunction with the opening and closing of the disc tray 50.

The switch slider 70 moves in conjunction with the tray-position detection slider 60 and presses the tactile switch 52 with the pressing force of the pressing rib 15 of the movable bezel 10 only when the disc tray 50 is closed.

The arm 51 is fixed at a position beside the disc drive device 2 and comes into contact with the tray-position detection slider 60 just before the disc tray 50 is closed so as to slide the tray-position detection slider 60.

The bezel-pressing spring 83 constantly biases the movable bezel 10 outward.

The slider-pushing spring 80 maintains a fixed distance between the sliders 60 and 70.

The slider-pulling spring 81 constantly pulls the tray-position detection slider 60 in a predetermined direction (i.e. the right direction in the drawings).

The state of each of the components in accordance with the opening and closing of the disc tray 50 and the process therebetween will be described below.

FIGS. 3B and 7 illustrate a state where the disc tray 50 is open.

In this state, the tray-position detection slider 60 is pulled by the slider-pulling spring 81 in the right direction to a position regulated by the stopper ribs 27.

The switch slider 70 is pushed by the slider-pushing spring 80 in the left direction relative to the tray-position detection slider 60, but is maintained in position with a predetermined distance from the tray-position detection slider 60 since the switch slider 70 is pulled due to the engagement relationship with the tray-position detection slider 60.

Figure 8:
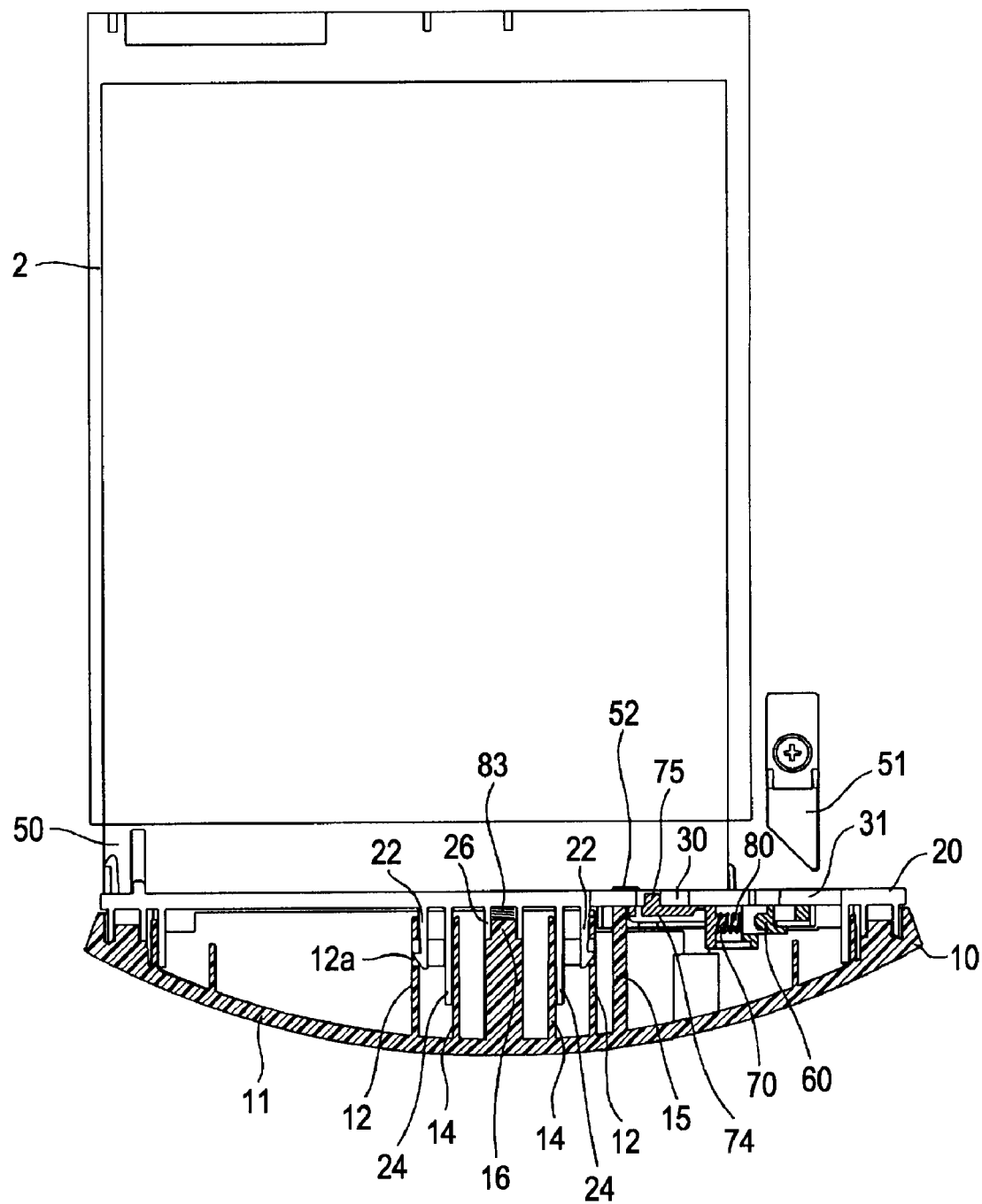
FIG. 8 is a plan view showing a moment when the disc tray according to the embodiment is getting ready to be closed.

FIG. 8 illustrates a moment when the disc tray 50 is getting ready to be closed. Specifically, FIG. 8 shows a state where the user has pushed the bezel front-surface 11 of the movable bezel 10 in order to close the disc tray 50 from the state shown in FIG. 1B.

When the movable bezel 10 is pushed, a force that tries to eject the disc tray 50 of the disc drive device 2 becomes a reactive force that pushes the movable bezel 10 inward toward the stationary bezel 20 while compressing the bezel-pressing spring 83. As the user continuously pushes the movable bezel 10, the disc tray 50 is pushed into the housing 1.

In the state where the disc tray 50 is open, the switch slider 70 is pulled by the tray-position detection slider 60, which is pulled rightward due to the slider-pulling spring 81. Thus, the switch slider 70 is maintained in position with a predetermined distance from the tray-position detection slider 60. At this position, the pressing portion 75 of the switch slider 70 is located at a position that does not face the tactile switch 52, as is apparent from FIGS. 7 and 8.

Therefore, even when the movable bezel 10 is pushed as in FIG. 8, the pressing rib 15 of the movable bezel 10 does not come into contact with the switch slider 70.

Specifically, in this state, an operation where the pressing portion 75 presses the tactile switch 52 in response to the pressing of the movable-plate portion 74 of the switch slider 70 by the pressing rib 15 is not implemented.

Figure 9:
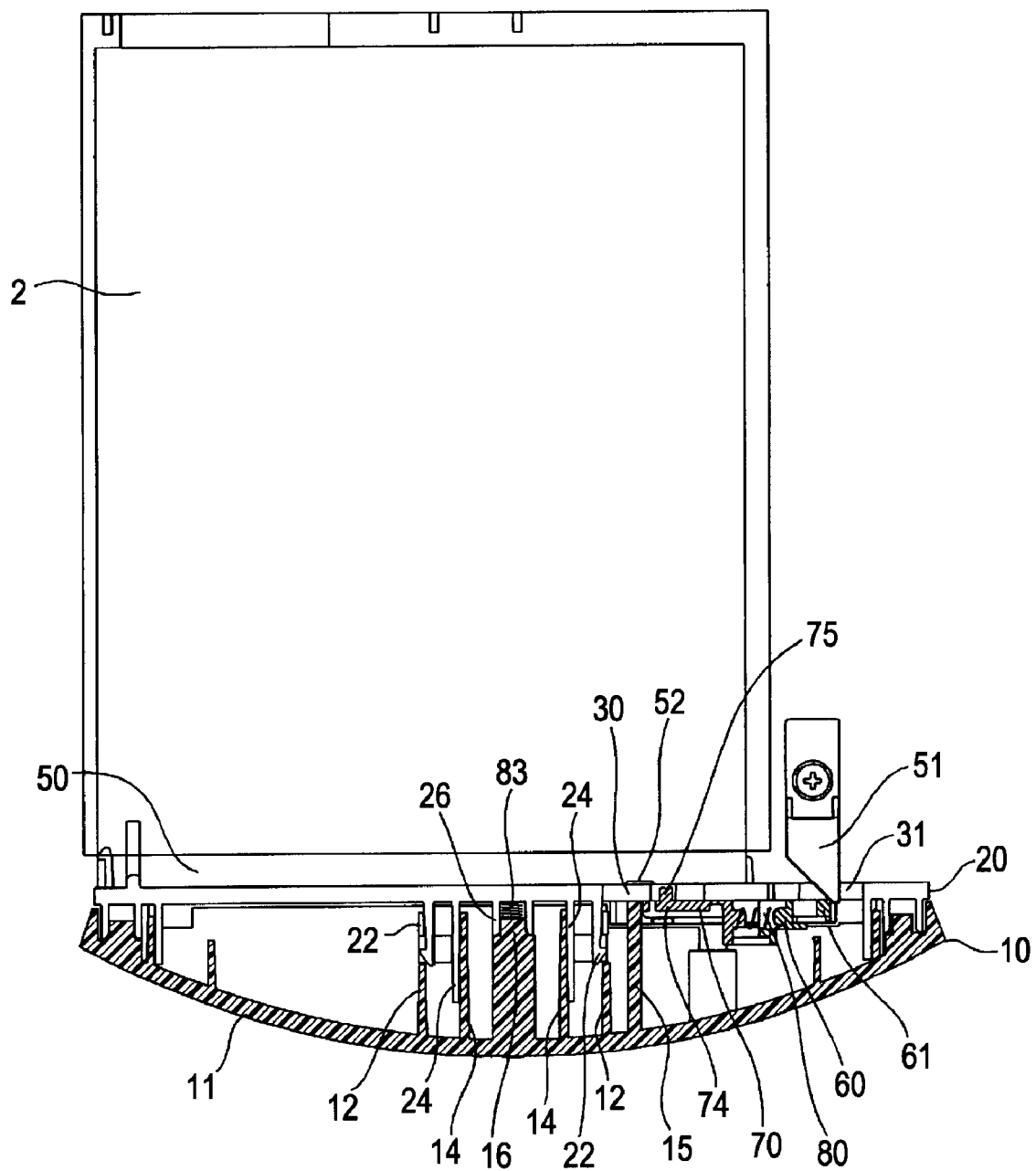
FIG. 9 is a plan view showing a state where an arm according to the embodiment is in contact with the tray-position detection slider.
Figure 10:
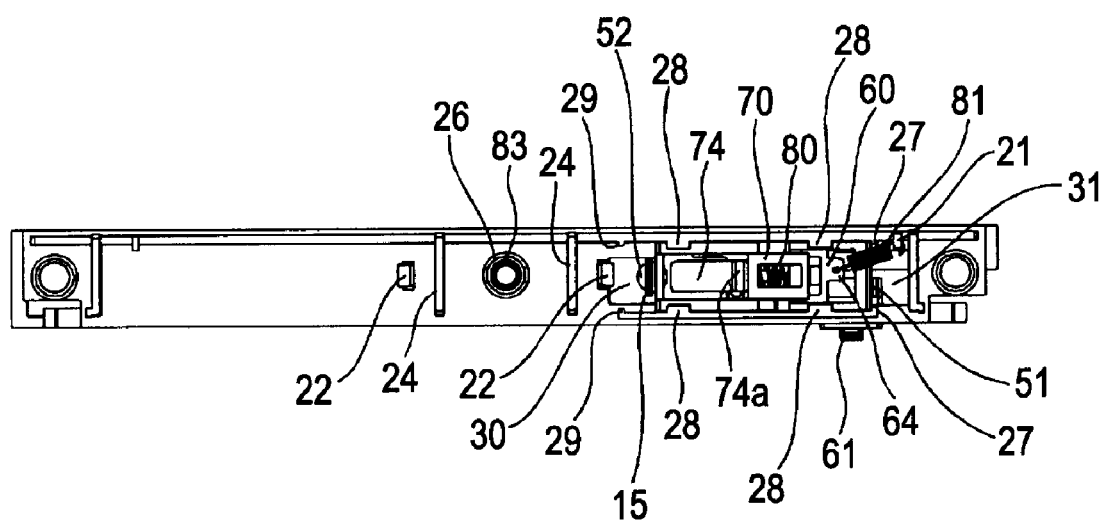
FIG. 10 is a front view showing a state where the arm according to the embodiment is in contact with the tray-position detection slider.

FIGS. 9 and 10 are a plan view and a front view, respectively, showing a state where the arm 51 is in contact with the tray-position detection slider 60.

As the disc tray 50 is pushed inward, the arm 51 is inserted into the stationary bezel 20 through the opening 31. As a result, the tip end (the inclined end surface) of the arm 51 comes into contact with the tray-position detection slider 60 as shown in FIG. 9.

As the disc tray 50 is pushed further inward after the arm 51 is brought in contact with the tray-position detection slider 60, the tip end of the arm 51 having the inclined end surface is inserted deeper into the opening 31, whereby the tray-position detection slider 60 is slid leftward of the drawing by being pushed by the tip end of the arm 51.

Although the switch slider 70 also tries to move leftward in response to the leftward movement of the tray-position detection slider 60, the pressing rib 15 of the movable bezel 10 prevents the leftward sliding of the switch slider 70 as shown in FIGS. 9 and 10, which means that the switch slider 70 is incapable of sliding. Regarding the movable bezel 10 in FIG. 10, only the pressing rib 15 is shown. Consequently, only the tray-position detection slider 60 is capable of moving leftward while compressing the slider-pushing spring 80.

Figure 11:
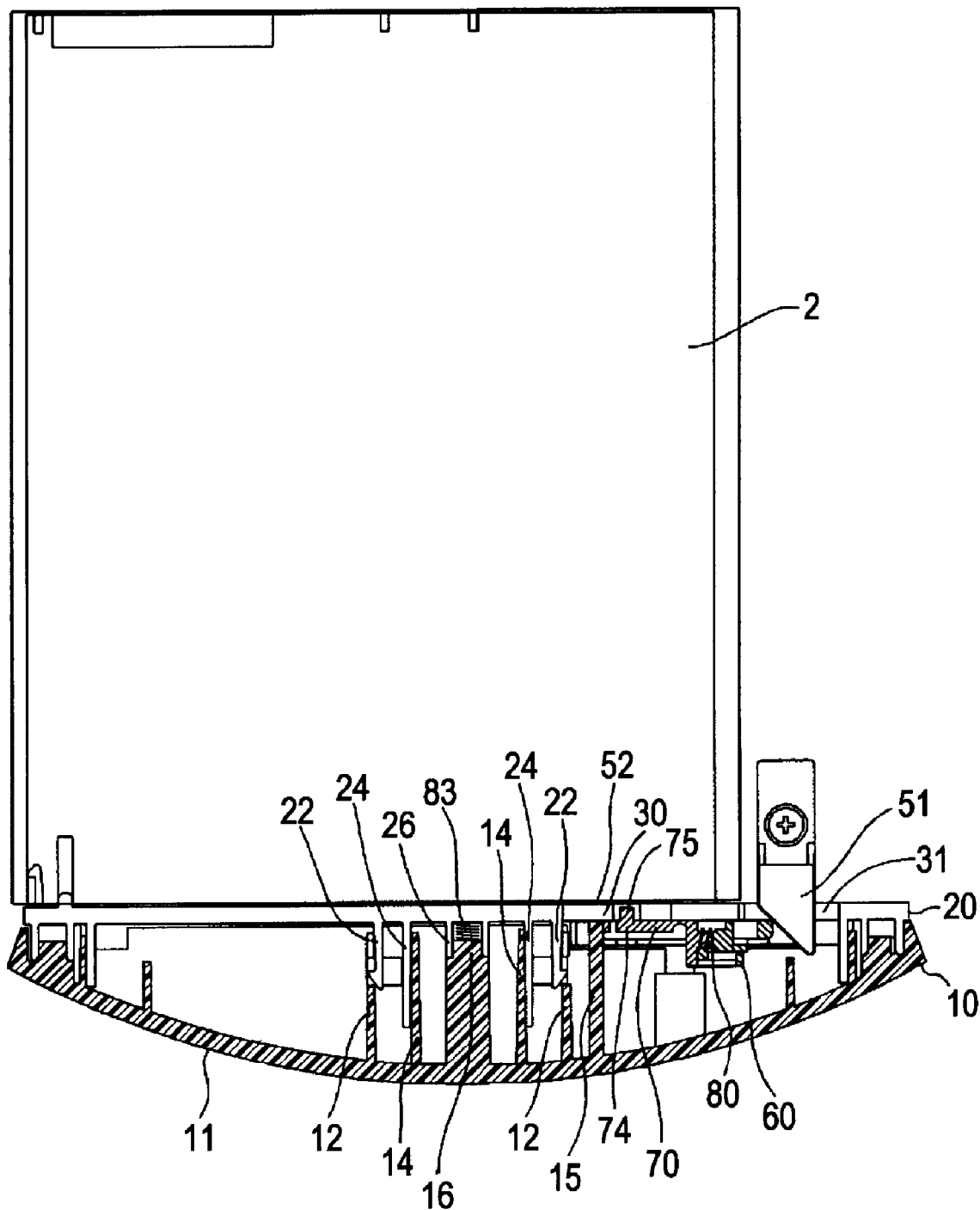
FIG. 11 is a plan view showing a state where the disc tray according to the embodiment is completely inserted in the disc drive device.
Figure 12:
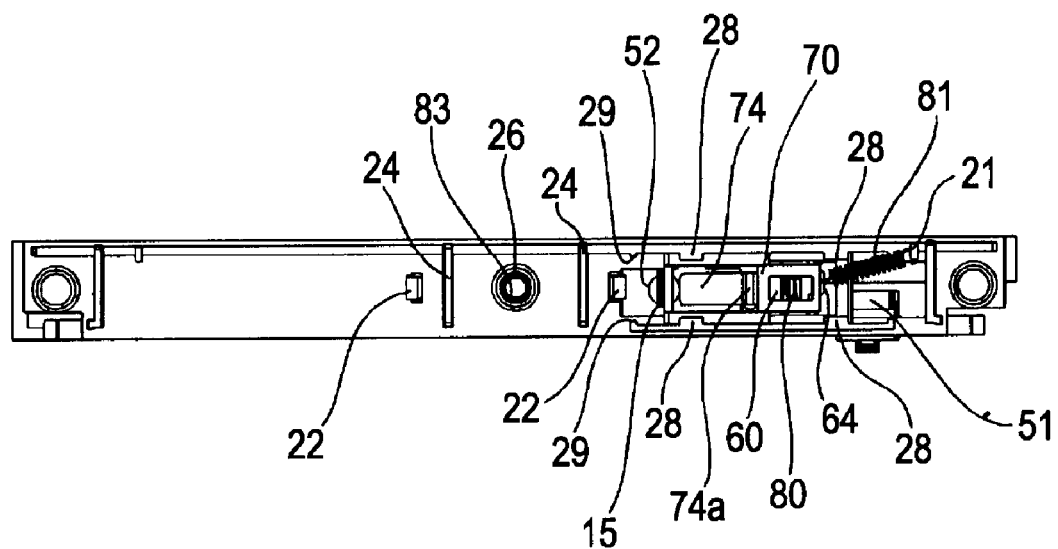
FIG. 12 is a front view showing a state where the disc tray according to the embodiment is completely inserted in the disc drive device.
Figure 13:
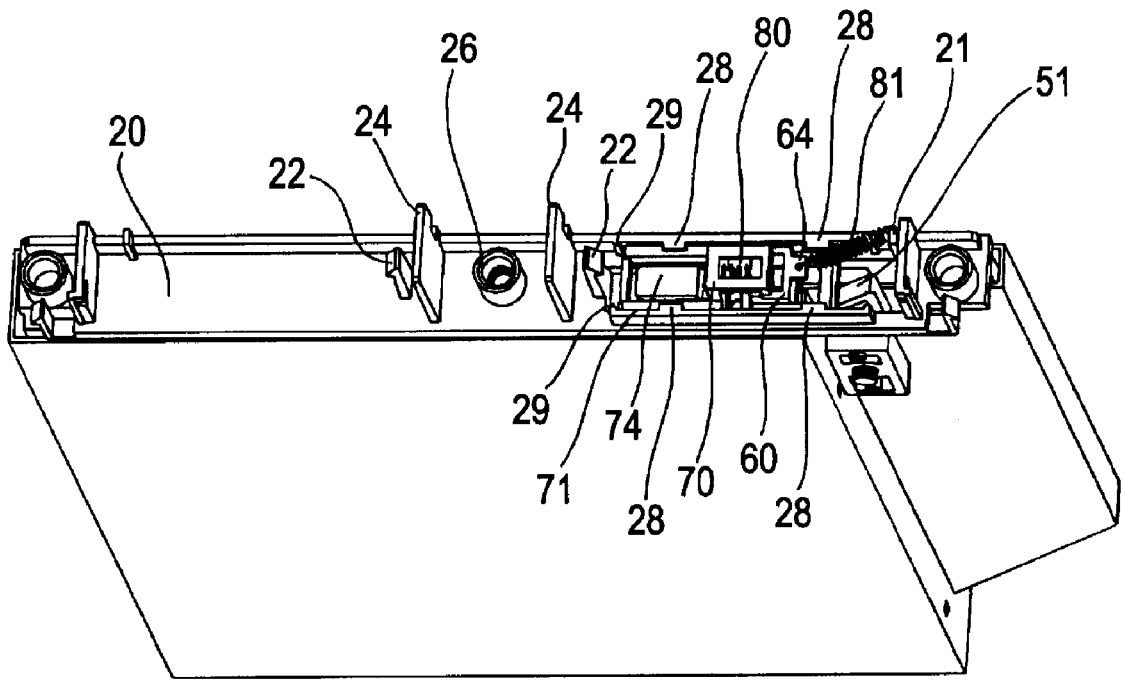
FIG. 13 illustrates a state where the disc tray according to the embodiment is closed, as viewed from below at an angle.

FIGS. 11 and 12 are a plan view and a front view, respectively, showing a state where the disc tray 50 is completely inserted in the disc drive device 2. FIG. 13 is a perspective view showing the same state. In other words, this is a state where the disc tray 50 is completely pushed and inserted in the disc drive device 2 by the user.

As described above, only the tray-position detection slider 60 moves leftward due to the arm 51 while compressing the slider-pushing spring 80, whereby the state shown in FIGS. 11, 12, and 13 is obtained.

After the disc tray 50 is completely inserted in the disc drive device 2 as shown in FIGS. 11, 12, and 13, the user may remove his/her hand from the movable bezel 10. Finally, this is a state where the disc tray 50 is closed.

Figure 14:
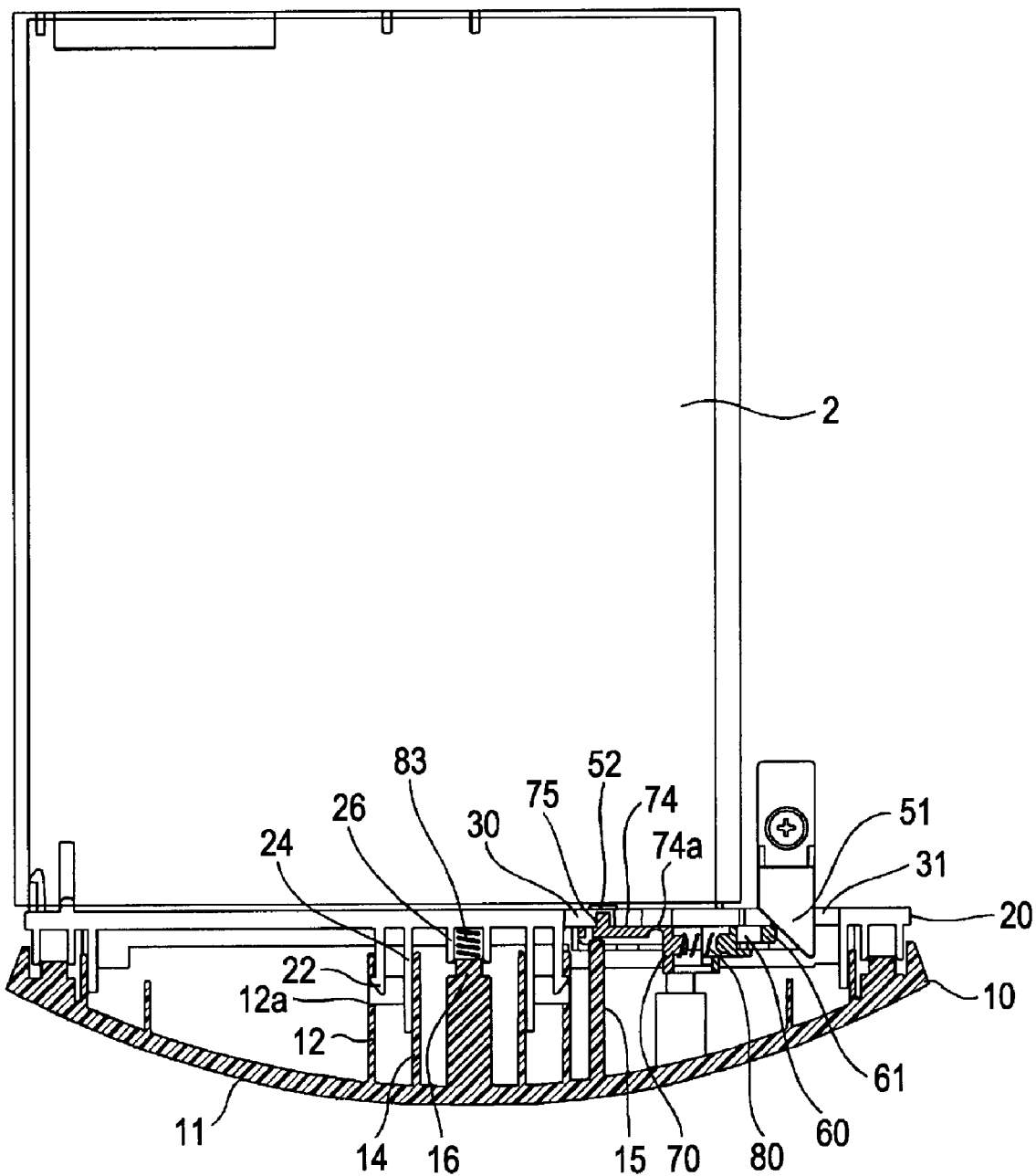
FIG. 14 is a plan view showing a state where the disc tray according to the embodiment is closed.
Figure 15:
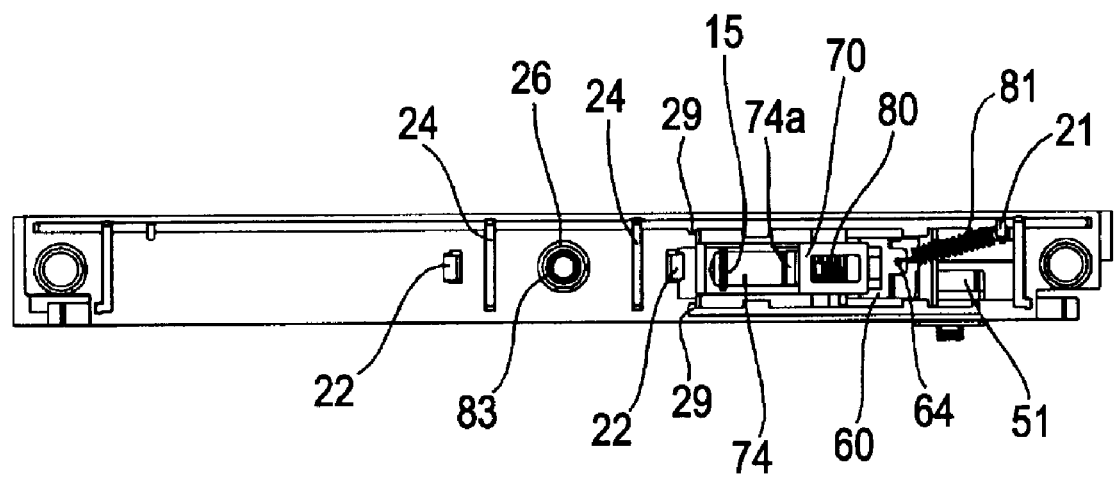
FIG. 15 is a front view showing a state where the disc tray according to the embodiment is closed.
Figure 16A:
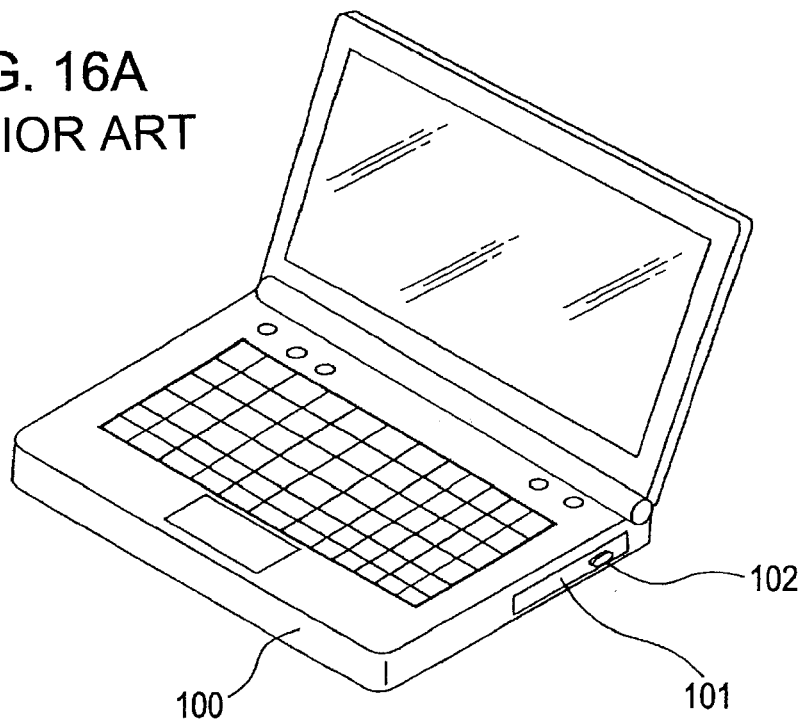
FIGS. 16A and 16B illustrate a disc drive device equipped with an ejection control button of related art.
Figure 16B:
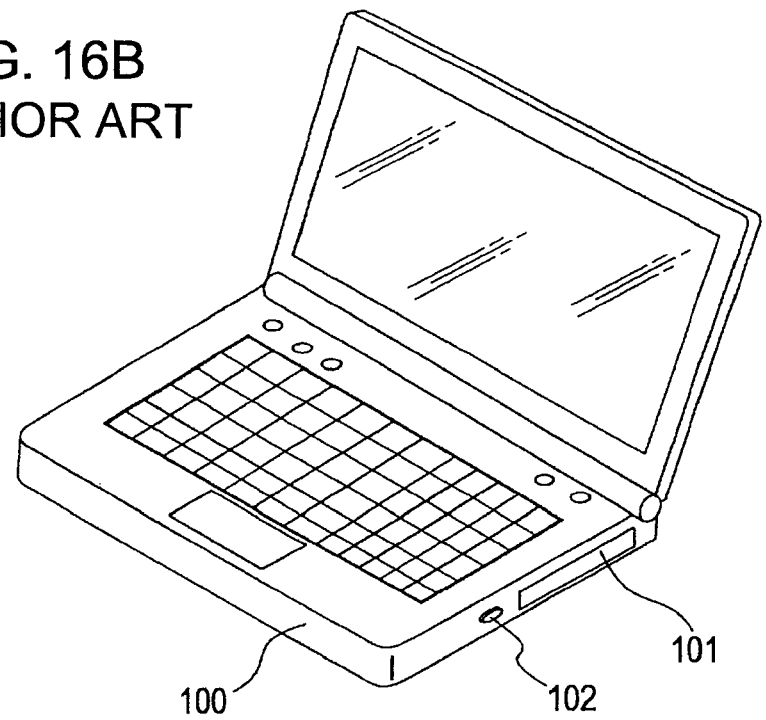

FIGS. 14 and 15 are a plan view and a front view, respectively, showing the state where the disc tray 50 is closed.

When the user removes his/her finger from the movable bezel 10, the previously compressed bezel-pressing spring 83 expands and pushes back the movable bezel 10 forward.

When the movable bezel 10 is pushed back, the switch slider 70 previously prevented from moving by the pressing rib 15 of the movable bezel 10 is pushed leftward by the slider-pushing spring 80, thereby moving to a position regulated by the stopper ribs 29.

It is apparent from the state shown in FIGS. 14 and 15 that the movable-plate portion 74 of the switch slider 70 is slid into a space in front of the tip end of the pressing rib 15. Regarding the movable bezel 10 in FIG. 15, only the pressing rib 15 is shown. At this position, the pressing portion 75 of the movable-plate portion 74 is positioned so as to face the tactile switch 52.

This state corresponds to the positional relationship in the state shown in FIG. 1A.

Subsequently, when the user pushes the bezel front-surface 11 of the movable bezel 10, the pressing rib 15 presses against the movable-plate portion 74 of the switch slider 70, whereby the pressing portion 75 of the movable-plate portion 74 presses the tactile switch 52.

In response to the pressing of the tactile switch 52, an eject signal is output, whereby an ejecting mechanism (not shown) is driven so as to eject the disc tray 50.

When the disc tray 50 is ejected, the arm 51 and the tray-position detection slider 60 come out of contact with each other, and the tray-position detection slider 60 and the switch slider 70 are pulled leftward by the slider-pulling spring 81. As a result, the positional state shown in FIGS. 3B and 7 is obtained.

As is apparent from the operation described above, the ejecting mechanism can be driven in response to pressing of the tactile switch 52 upon pushing of the bezel front-surface 11 of the movable bezel 10 by the user only when the disc tray 50 is closed.

In other words, even if the bezel front-surface 11 is pushed to close the disc tray 50 from an open state, the tactile switch 52 is prevented from being pressed. In addition, even if the user continuously pushes the bezel front-surface 11 to close the disc tray 50 completely, the tactile switch 52 is prevented from being pressed until the disc tray 50 reaches the completely inserted position.

With the tray ejecting mechanism according to this embodiment, a bezel-pushable-type ejecting mechanism with the bezel itself functioning as a control button can be achieved without having to provide an ejection control button on a bezel. In other words, this prevents the ejecting mechanism from being actuated needlessly upon pushing of the bezel by the user, and prevents the disc tray 50 from being re-ejected when the user desires to close the disc tray 50.

Moreover, since the bezel itself can be used as an ejection control button, the limitations in design and layout of the bezel (i.e. the movable bezel 10) can be reduced. Accordingly, a bezel front-surface 11 with a good appearance can be designed on the side surface of the cylinder as shown in FIGS. 1A and 1B, or can be designed with an arbitrary shape on a flat portion.

In addition, the bezel front-surface 11 entirely functioning as a large ejection control button allows for extremely high operationability for the user.

Furthermore, this feature also allows the medium drive device to be set at a location of an apparatus such as a personal computer where, with a small ejection control button of the related art, it is difficult to find the button or to press the button. Consequently, this reduces limitations in design and layout of the apparatus.

Accordingly, this embodiment of the present invention contributes to enhanced external appearance of the disc drive device, enhanced external appearance of the apparatus equipped with the disc drive device, and better usability.

The ejecting mechanism of this embodiment can be readily realized by attaching the stationary bezel 20 and the movable bezel 10 onto the front surface of a normal ejectable disc tray 50, and attaching the arm 51 onto a desired position of the disc drive device 2. Therefore, it is not necessary to change the structure of the disc drive device 2 or the software.

Although the above embodiment is applied to the disc drive device 2 as an example, the embodiment of the present invention can be widely applied to various ejectable-tray-type medium drive devices.

For example, such various ejectable-tray-type medium drive devices may include an optical disc drive device that holds a bare disc such as a compact disc (CD) or a digital versatile disc (DVD) on a tray, and a cartridge disc drive device having a tray that holds a cartridge disc, which is a medium that contains an optical disc within a cartridge.

Other medium drive devices to which the above embodiment of the present invention is applicable include a tape drive device that holds a tape medium cartridge on a tray, and a medium drive device having a tray used for mounting a flash memory medium or a hologram memory medium thereto.

It should be understood by those skilled in the art that various modifications, combinations, sub-combinations and alterations may occur depending on design requirements and other factors insofar as they are within the scope of the appended claims or the equivalents thereof.

What is claimed is:

1. A tray ejecting mechanism comprising:
a stationary bezel mounted to a front surface of an ejectable tray included in a medium drive device; and
a movable bezel attached to the stationary bezel in a movable manner in a front-back direction while being biased towards a front surface of the movable bezel, the movable bezel serving as an outer housing of the medium drive device contained in an electronic apparatus,
wherein the stationary bezel includes
a detection component that is positionally shiftable in accordance with an open/close position of the tray, and
a switch component having a pressing portion for pressing an ejection switch provided on the tray, the switch component being positionally shiftable in conjunction with the detection component,
wherein the movable bezel includes
a pressing rib that applies a pressing force to the pressing portion in order to press the ejection switch,
wherein when the tray is closed, the switch component is positioned such that, as the movable bezel is pushed inward toward the stationary bezel, the pressing rib applies the pressing force to the pressing portion so that the pressing portion presses the ejection switch, and
wherein when the tray is open, the switch component is positioned such that the ejection switch is prevented from being pressed by the pressing portion even if the movable bezel is pushed inward toward the stationary bezel.

2. The tray ejecting mechanism according to claim 1, further comprising an arm contactable with the detection component, wherein a contact relationship the arm has with the detection component is changeable in accordance with the open/close position of the tray so that the detection component is positionally shiftable in accordance with the open/close position of the tray.

3. The tray ejecting mechanism according to claim 1, wherein when the tray is closed, the pressing portion of the switch component is at a position facing the ejection switch in accordance with the position of the detection component so that when the movable bezel is pushed inward toward the stationary bezel, the pressing portion presses the ejection switch in response to the pressing force of the pressing rib, and
wherein when the tray is open, the pressing portion of the switch component is positioned so as not to face the ejection switch in accordance with the position of the detection component, and wherein when the movable bezel is pushed inward toward the stationary bezel, the pressing rib restricts the movement of the switch component to prevent the pressing portion from reaching the position facing the ejection switch so as to prevent the ejection switch from being pressed.

4. The tray ejecting mechanism according to claim 1, wherein the detection component and the switch component include sliders that are slidable within the stationary bezel.

5. A tray ejecting mechanism comprising:
a stationary bezel mounted to a front surface of an ejectable tray included in a medium drive device;
a movable bezel attached to the stationary bezel in a movable manner in a front-back direction while being biased towards a front surface of the movable bezel, the movable bezel serving as an outer housing of the medium drive device contained in an electronic apparatus; and
an arm fixed at a predetermined position,
wherein the stationary bezel includes
- a detection component that is positionally shiftable in accordance with an open/close position of the tray, the detection component being positionally shifted on the basis of a contact relationship the detection component has with the arm, and
- a switch component having a pressing portion for pressing an ejection switch provided on the tray, the switch component being positionally shiftable in conjunction with the detection component, wherein the movable bezel includes
- a pressing rib that applies a pressing force to the pressing portion in order to press the ejection switch, wherein when the tray is closed, the pressing portion of the switch component is at a position facing the ejection switch in accordance with the position of the detection component so that when the movable bezel is pushed inward toward the stationary bezel, the pressing rib applies the pressing force to the pressing portion so as to operate the ejection switch, and wherein when the tray is open, the pressing portion of the switch component is positioned so as not to face the ejection switch in accordance with the position of the detection component, and wherein when the movable bezel is pushed inward toward the stationary bezel, the pressing rib restricts the movement of the switch component to prevent the pressing portion from reaching the position facing the ejection switch so as to prevent the ejection switch from being operated.

6. A medium drive device having an ejectable tray, comprising:
a tray ejecting mechanism that includes
- a stationary bezel mounted to a front surface of the tray, and
- a movable bezel attached to the stationary bezel in a movable manner in a front-back direction while being biased towards a front surface of the movable bezel, the movable bezel serving as an outer housing of the medium drive device contained in an electronic apparatus, wherein the stationary bezel includes
- a detection component that is positionally shiftable in accordance with an open/close position of the tray, and
- a switch component having a pressing portion for pressing an ejection switch provided on the tray, the switch component being positionally shiftable in conjunction with the detection component, wherein the movable bezel includes
- a pressing rib that applies a pressing force to the pressing portion in order to press the ejection switch, wherein when the tray is closed, the switch component is positioned such that, as the movable bezel is pushed inward toward the stationary bezel, the pressing rib applies the pressing force to the pressing portion so that the pressing portion presses the ejection switch, and wherein when the tray is open, the switch component is positioned such that the ejection switch is prevented from being pressed by the pressing portion even if the movable bezel is pushed inward toward the stationary bezel.

* * * * *